US 6,839,322 B1

United States Patent
Ashwood Smith

(10) Patent No.: US 6,839,322 B1
(45) Date of Patent: Jan. 4, 2005

(54) METHOD AND SYSTEM FOR OPTICAL ROUTING OF VARIABLE-LENGTH PACKET DATA

(75) Inventor: Peter J. Ashwood Smith, Hull (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/501,517

(22) Filed: Feb. 9, 2000

(51) Int. Cl.[7] ................................................. H04J 3/24
(52) U.S. Cl. ..................... 370/235; 370/392; 370/395.1; 370/412; 370/474; 370/476
(58) Field of Search ................. 370/229–237, 370/352, 389, 392, 395.1, 397, 401, 412–414, 471, 474, 476

(56) References Cited

U.S. PATENT DOCUMENTS

| | | | | |
|---|---|---|---|---|
| 5,173,898 A | * | 12/1992 | Heinzmann et al. | 370/440 |
| 5,617,233 A | | 4/1997 | Boncek | 359/123 |
| 5,917,828 A | * | 6/1999 | Thompson | 370/474 |
| 6,021,419 A | * | 2/2000 | Clarke, Jr. et al. | 708/300 |
| 6,222,858 B1 | * | 4/2001 | Counterman | 370/474 |
| 6,314,098 B1 | * | 11/2001 | Masuda et al. | 370/392 |
| 6,331,978 B1 | * | 12/2001 | Ravikanth et al. | 370/392 |
| 6,374,314 B1 | * | 4/2002 | Darnell et al. | 710/52 |

* cited by examiner

*Primary Examiner*—Steven Nguyen
*Assistant Examiner*—Roberta Stevens
(74) *Attorney, Agent, or Firm*—Kent Daniels; Ogilvy Renault

(57) ABSTRACT

A method and system of routing variable-length packet data across a wave division multiplex (WDM) communications network having a plurality of data communications channels comprises inverse-multiplexing each data packet into a respective frame. Each frame includes a label block containing label information of the frame, and two or more respective payload blocks having a predetermined length. The label block contains encoded routing information, a start time, and, possibly an end time, and is transmitted over a label channel of the communications network. The start time preferably indicates a delay between launching a first bit of the label clock and the first bit of the payload blocks. The end time may be a bit count indicative of the location of the last bit of the data packet within the frame. The data packet is divided into a plurality of data segments, each of which is transported across the network within a respective payload block. Each payload block is transmitted over a respective separate data channel of the communications network. Routing control of the frame may be handled using the multi-protocol label switch (MPLS) protocol.

37 Claims, 6 Drawing Sheets

METHOD AND SYSTEM FOR OPTICAL ROUTING OF VARIABLE-LENGTH PACKET DATA

CROSS-REFERENCE TO RELATED APPLICATIONS

This is the first application filed for the present invention.

MICROFICHE APPENDIX

Not Applicable.

TECHNICAL FIELD

The present invention relates to optical communications networks, and in particular to a method and system for optical routing of variable length packet data across an optical communications network.

BACKGROUND OF THE INVENTION

Optical communications networks have recently become established as the preferred backbone for data communications because of the high bandwidth capacity of the optical fiber links. Concurrently, the internet protocol (IP) is gaining popularity for controlling the routing of packetized data across a communications network. Typically, IP packets are converted into optical form and launched into a fiber optic link towards a node of the network. When the optical signal arrives at the node, it is usually converted back into electronic form and buffered to allow the header portion of the IP packet to be extracted and decoded to determine the routing for the next hop towards the destination.

This solution suffers the disadvantage that within each node of the optical network, the IP packet must be converted from optical to electronic form and then back into optical form for transmission over the next link. Thus, while the bandwidth capacity of each fiber link may be very high, the overall bandwidth capacity of the network is restricted by the speed and reliability of the electronic components of each node, and in particular the speed with which optical signals can be converted into electronic signals and buffered. U.S. Pat. No. 5,617,233, issued to Boncek on Apr. 1, 1997, proposes a solution to this problem by providing a transparent optical node structure for use in a two-connected optical packet switching architecture. According to Boncek, each packet is separated into its respective header and payload portions. The header portion is transmitted over a link on one wavelength (or channel) and the data portion of the packet is transmitted on a second wavelength. Accordingly, at each node it is only necessary to electronically decode the header portion of the packet, which can be easily detected independently of the data portion of the packet. The decoded header portion can then be used to determine packet routing in a conventional manner, and this routing information is used to control a transparent optical switch to guide the data portion of the packet through the transparent optical switch and into a downstream link without being converted into an electronic signal and back again to an optical signal. Optical buffering of the data portion of the packet (e.g. by use of one or more fiber rings having a predetermined length) is used to ensure proper timing between the header and data portions of each packet, and may also be used to resolve contention issues and provide add/drop functionality of the node.

Known methods of buffering (or delaying) optical signals rely on the use of optical fiber rings or the like having a predetermined length. An optical signal can therefore be delayed for a period of time by launching the signal into the fiber ring. According to Boncek, such a ring is used on the input side of each node to delay the data portion of the packet for a period of time sufficient to allow the header portion to be decoded and the transparent optical switch set to provide routing of the data portion through to the appropriate output node. The delay loop on the input side of the node can also be adjusted to compensate for known differences in the propagation speed of the header and data portions of the packet through the link. A further delay ring can also be used within the transparent optical switch to resolve contention issues by enabling a data portion of a packet to be delayed by a period of time equivalent to the length of a data packet arriving on another input node, to thereby enable that other data packet to clear an output port before the first data packet arrives at that same output port.

The use of a fiber ring for delaying and buffering optical signals suffers the disadvantage that the amount of delay is governed primarily by the length of the fiber ring (the time delay is equal to the length of the ring divided by the speed of light in the fiber medium of the ring). This is generally fixed during the design and construction of the fiber ring, and cannot be varied during operation of the node. Because contention resolution requires one data packet to be delayed by a period of time equal to or greater than the length of a second data packet, assumptions must be made concerning the maximum allowable packet length during the design phase of the node. Successful operation of the network depends on the data packets never being longer than the previously defined maximum allowable length. If the defined maximum length is too large, unnecessarily long delays will be incurred as packets move through the node. Alternatively, if the defined maximum length is too small, the available band-width of the network may be unnecessarily limited.

Boncek's use of delay rings at the input of the network node imposes a further restriction that the size and content of the packet header must also be predetermined at the time of design and construction of the node, because the header portion must be fully decoded and interpreted before the delayed data portion arrives at the transparent optical switch. In light of the foregoing, it will be apparent that the transparent optical node structure of Boncek will only work in a network environment in which data packets of a uniform predefined size and format are employed.

However, in the modern network space, packetized data traffic of multiple different protocols (e.g. internet protocol, asynchronous transfer mode, etc.) is transported over a common network infrastructure. Each protocol provides its own packet (or frame) size and format standards. Additionally, some protocols (e.g. IP) are specifically designed to allow packets having widely varying lengths. New routing protocols, for example the multi protocol label switching (MPLS) protocol have been proposed to facilitate multi-protocol traffic across a common network infrastructure. Such routing protocols are commonly derived from the internet protocol, and are also specifically designed to handle data packets having widely differing format and size.

Accordingly, a system enabling full optical routing of variable length packetized data traffic across a communications network remains highly desirable.

SUMMARY OF THE INVENTION

An object of the present invention is to provide a method and system enabling full optical routing of variable length packetized data across an optical communications network.

Another object of the present invention is to provide an optical communications system in which variable length packetized data is optically routed across the communications system within fixed length data frames.

A still further object of the present invention is to provide an optical communications system in which variable length data packets are optically routed across the communications system on the basis of routing information encoded within a label block which is independent of the format of the variable length data packet.

A still further object of the present invention is to provide an optical communications system in which routing information of a data frame is encoded within a label block that is transported across the communications system on a predetermined label channel, and a variable length data packet is inverse multiplexed and transported across the communications system on a plurality of separate data channels.

Accordingly, an aspect of the present invention provides a method of routing variable-length packet data across a communications network having a plurality of data communications channels. A data packet is inverse-multiplexing into a frame comprising: a label block containing label information of the frame; and two or more respective payload blocks having a predetermined length. The label block is transmitted over a label channel of the communications network. Each payload block is transmitted over respective separate data channels of the communications network.

Another aspect of the present invention provides a communications network adapted for communication of variable length data packets. The communications network comprises: an interface for inverse-multiplexing a data packet into a frame having a label block containing label information of the frame, and two or more respective payload blocks having a predetermined length; a first optical coupler for transmitting the label block over a label channel of the communications network; and a respective second optical coupler for transmitting each payload block over a respective separate data channel of the communications network.

A further aspect of the present invention provides a router for routing packet data traffic between a first and a second link of a communications network adapted for communication of data packets having a variable length. The data packets are transported within data frames comprising a label block and two or more payload blocks having a predetermined length. The label block is carried on a label channel of the communications network, and the payload blocks are carried on respective data channels of the communications network. The router comprises: at least one input port connected to the first link for receiving sequential frames; at least one output port connected to the second link for sending sequential frames; a label decoder adapted to decode a label block received over the label channel through the input port; a switch controller responsive to the label decoder to generate a routing control signal indicative of a selected output port; a transparent optical switch responsive to the routing control signal to establish a transparent optical path between the input port and the selected output port; and a label regenerator adapted to regenerate the label block for sending over the label channel through the selected output port.

The communications network may be a wave division multiplex (WDM) optical network. Preferably, the communications network is adapted for multi-protocol label switched (MPLS) routing of the packet data traffic. The packet data traffic may include any one or more of internet protocol (IP) packets having a variable length, and asynchronous transfer mode (ATM) frames.

A number N of payload blocks, and the predetermined length of each payload block of each frame can be selected based on an expected mean length of the data packets, or may be selected based on other criteria. In either case, inverse-multiplexing a data packet preferably includes dividing the data packet into N packet segments of substantially equal length. When the length of each packet segment is less than or equal to the length of each payload block, each packet segment can be buffered for transmission within a respective payload block of a frame.

Alternatively, when the length of each packet segment is greater than the length of each payload block, each packet segment may be subdivided into two or more portions, each portion having a length equal to or less than the length of a payload block. Each portion may then be buffered for transmission within a respective payload block of respective successive frames. By this means, a large data packet can be subdivided into two or more portions and transmitted within a corresponding number of frames. The length of each portion may be the same, or may differ.

The label block of each frame preferably comprises encoded information concerning at least a start time and routing across the network of the frame. The start time may be indicative of a delay period between an arrival time of the label block and an arrival time of the payload blocks of a frame. The start time may also be indicative of a delay period between transmission of the label block of a frame, and subsequent transmission of the payload blocks of the frame.

Preferably, the delay period is selected such that the step of establishing a transparent optical path between the input port and the selected output port is completed prior to arrival of the payload blocks of the frame at the input port of the router. This allows the router to set-up the path between the input and output ports prior to arrival of the payload blocks, which can therefore be guided through the router without buffering.

The label block may also include an end time indicative of the location of the last bit of the data packet within the payload blocks. By this means, in cases where the packet segments are smaller than the payload blocks, the unused portion of the payload blocks can be filled with predetermined stuff bits (e.g. a clock signal). The data bits of the data packet can subsequently be separated from the stuff bits by means of the end time.

The router may include a label regenerator for regenerating the label block of the frame, and an optical coupler for transmitting the regenerated label block over the label channel through the selected output port. Additionally, the router may include means for delaying the payload blocks of the frame for a predetermined period of time during passage of the payload blocks through the router between the input and output ports. The predetermined period is preferably selected to preserve the start time encoded in the label block as the frame passes through the router. By this means, successive routers can be used for end-to-end transport of the frame across the network.

An advantage of the present invention is that it facilitates full optical routing of IP packets, which naturally vary widely in length, using optical routing equipment designed to accommodate fixed-length data packets.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
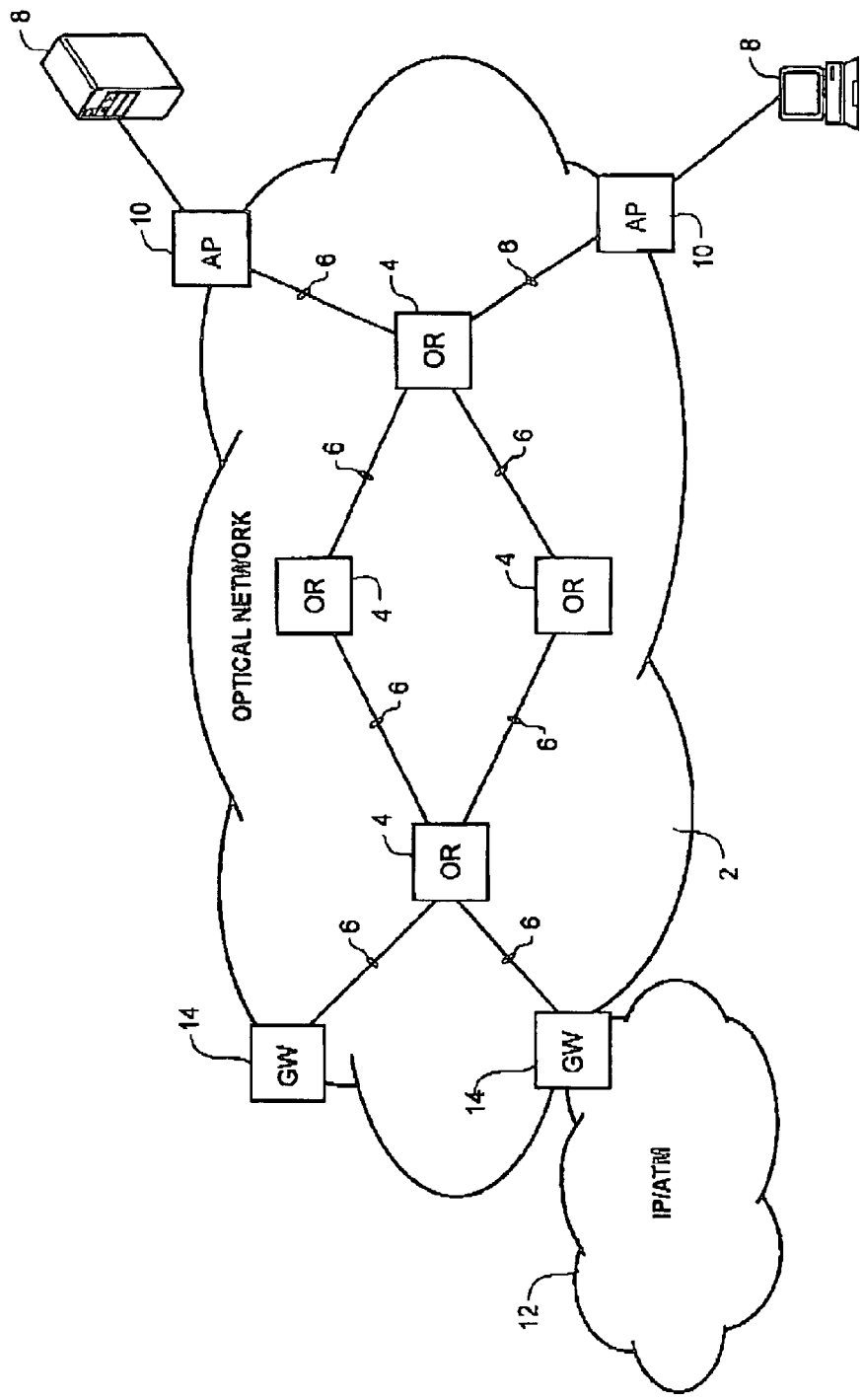
FIG. 1. is a block diagram illustrating an optical communications network usable in conjunction with an embodiment of the present invention.

The present invention provides a system for fully optical routing of variable length packetized data traffic, for example internet protocol (IP) packets and/or asynchronous transfer mode (ATM) frames across an optical network. AS shown in FIG. 1, an optical network 2 usable in conjunction with the present invention generally comprises a plurality of optical routers 4 (four are shown in FIG. 1) interconnected by fiber optic links 6. Communications devices 8, for example end user personal computers (PCs) or local area network (LAN) servers may be connected to the optical network 2 via one or more access points 10. The optical network 2 may also be connected to one or more federated networks 12, for example an ATM or an IP network, through a respective gateway 14. Within the optical network 2, each of the optical routers 4 is configured for wave division multiplex (WDM) and/or dense wave division multiplex (DWDM) transport of packet data traffic as will be described in greater detail below.

Figure 2A:
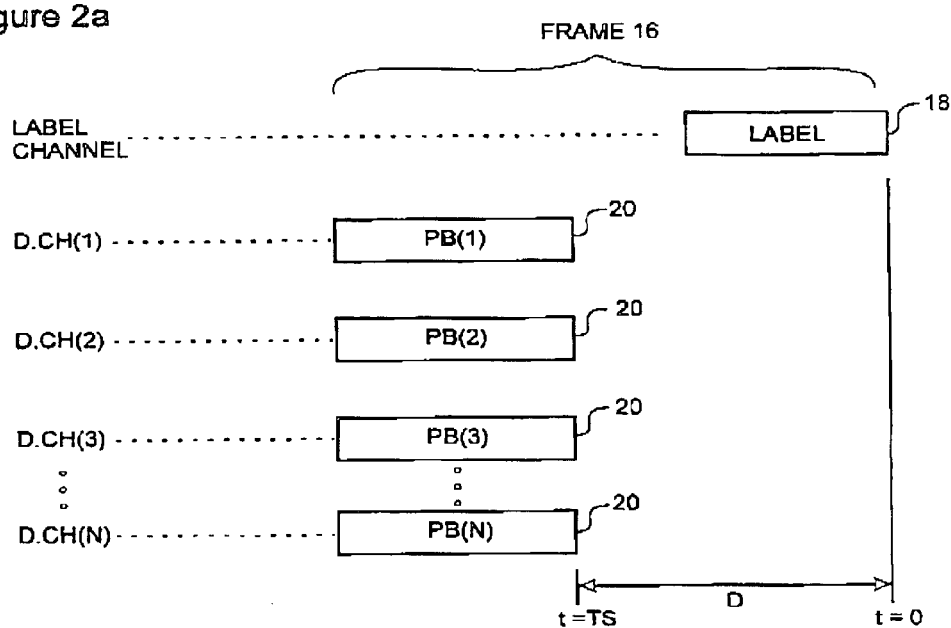
FIGS. 2a and 2b are block diagrams illustrating an inverse multiplex frame in accordance with an embodiment of the present invention and illustrating the effect of differing propagation speeds through fiber optic media.

As shown in FIG. 2a, in accordance with the present invention, packetized data is transported across the optical network 2 within a frame 16 comprising a label block 18 and two or more payload blocks 20. Each block (18,20) of the frame 16 is transported across the network 2 on a respective channel (wavelength). Thus the label block 18 is transported on a respective label channel, and each payload block 20 is transported on a respective payload channel. Preferably, each of the label and payload channels are predetermined, and remain constant across the optical network 2, so that end-to-end transport of each of the blocks 18,20 is effected without requiring wavelength conversions.

Figure 2B:
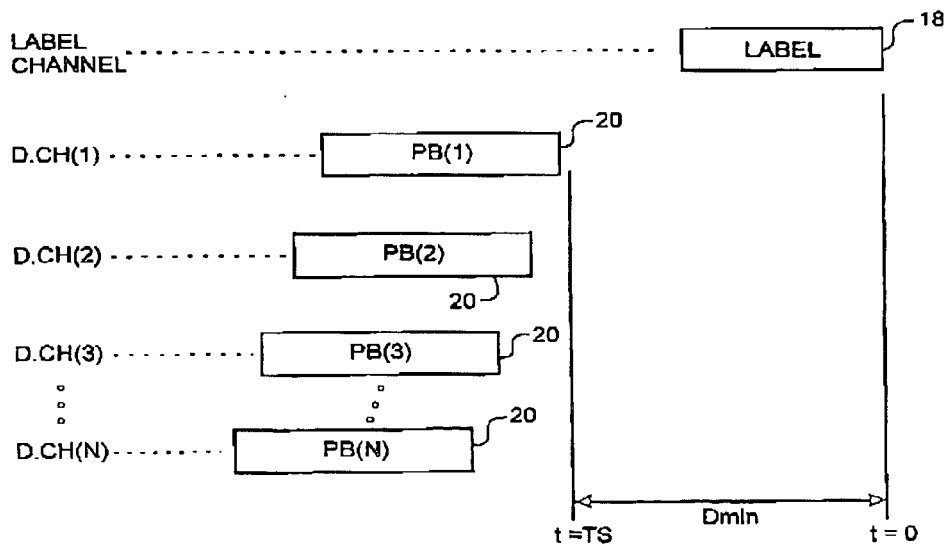

The label block 18 comprises encoded information concerning the routing of the frame 16 across the network 2 and a start time (TS) of the payload blocks 20 of the frame 16. Encoded information of an end time TE may also be included in the label block 18. The routing information may, for example, be an address on the optical network 2 of an access point 10 serving an end-user communications device 8, or a gateway 14 connecting the optical network 2 to an adjacent federated network 12. The encoded start time (TS) is used to provide an indication of the length of a time delay (D) between the label block 18 and the payload blocks 20 of the frame 16. There are a variety of ways in which the delay period (D) may be determined. For example, it may be convenient to set the start time (TS) based on a predetermined delay (D) between transmission of the first bit of the label block 18 and transmission of the first bit of the payload blocks 20, as shown in FIG. 2a. In this case, as the label and payload blocks 18,20 propagate through a link 6, differing propagation speeds of each of the blocks 18,20 will cause the frame to spread. By suitable selection of the wavelengths for each of the label and payload channels, frame spread can be controlled such that all of the payload blocks 20 tend to lag behind the label block 18 as shown in FIG. 2b. In this case, at each optical router 4 of the optical network 2 the start time (TS) encoded in the label block 18 will indicate a minimum delay period ($D_{min}$) between arrival of the first bit of the label block 18 and the arrival of the first bit of the first (i.e. the fastest) payload block 20a. The start time (TS) can be determined in other ways based on the selection of the channel wavelengths for each of the label and payload channels and the propagation speeds of optical signals at those wavelengths. Other factors may also influence the selection of the start time (TS) and the delay period (D). In either event, the start time (TS) is selected such that at each optical router 4, the label block 18 arrives at the optical router 4 a period of time prior to the payload blocks 20 sufficient to enable the label block 18 to be decoded and the optical router 4 configured (as will be described in greater detail below) for routing of the payload blocks 20 prior to arrival of the first bit of the payload blocks 20 at the optical router 4.

The end time TE is used to provide an indication of the location of the last data bit within the payload blocks 20, and may, for example, take the form of a bit count of the data packet. The end time TE is of particular use in cases where the size of a data packet is less than the data capacity of the payload blocks 20. In such cases, the payload blocks 20 are only partially filed with "live" data, and the remaining portion of the payload blocks 20 remains unused. In order to maintain system synchronization across the optical network 2, it may be preferable to fill the unused portion of the data blocks 20 with predetermined stuff bits (for example, a clock signal) rather than leave it empty. However, when the original data packet is to be extracted from the frame 16, it becomes necessary to separate the live data from the stuff bits. This can readily be accomplished by means of the end time TE encoded in the label block 18, as will be described in greater detail below.

As described above and illustrated in FIGS. 2a and 2b, each of the payload blocks 20 is transmitted on its own respective payload channel (wavelength), which is different from the label channel used for transmission of the label block 18. Additionally, each of the N (where N is a predetermined number, and is at least 2) payload blocks 20 has a fixed predetermined length. The length of a data block 20 may conveniently be defined in terms of time (or equivalently, distance) which is advantageous for resolving issues related to buffering and/or delaying payload blocks 20. The data capacity of each payload block 20 (and thus of the frame 16 as a whole) will then be defined as the bit rate multiplied by the payload block length.

The number and length of the payload blocks 20 may be selected in accordance with various criteria including, for example, an expected mean size of data packets to be transported across the optical network 2. Selection of a suitable combination of the number N of payload blocks 20 and the length of the payload blocks 20 can yield a highly versatile data transport frame 16 which minimizes the amount of wasted (i.e. unused) frame capacity incurred during the transport of live data. For example, internet protocol (IP) packets may vary in size between a few bytes (e.g. conveying information of a mouse button click) and four thousand bytes or more (e.g. conveying information of a video image). A frame 16 may, for example, be configured to transport 512 bytes within the payload blocks 20. In this case, an IP packet conveying information of a mouse button click would be transported within a frame 16 in which the payload blocks are mostly empty, or may contain stuff bits (e.g. a clock signal). Conversely, an IP packet conveying information of a video image may be transported across the optical network 2 within several successive frames 16 each containing closely similar label information. The operation of the invention in both of these cases will be described in greater detail below. In either case, for any given data capacity of a frame 16 it is possible to select between a large number N of short payload blocks 20 and a small number N of long payload blocks 20. The use of short data blocks 20 has an advantage in that the data blocks 20 of the frame 16 can be processed through an optical router 4 in a comparatively short period of time, thereby reducing the probability of contention issues arising from two or more frames 16 arriving at respective input ports of the optical router 4 and destined to be routed over the same outbound link for their next hop. On the other hand, the use of a large number N of payload blocks may be limited by the number of channels available for packetized data traffic, either due to physical limitations of network equipment, or due to the need to provide a minimum number of channels for connection oriented traffic through the optical network 2.

Figure 3:
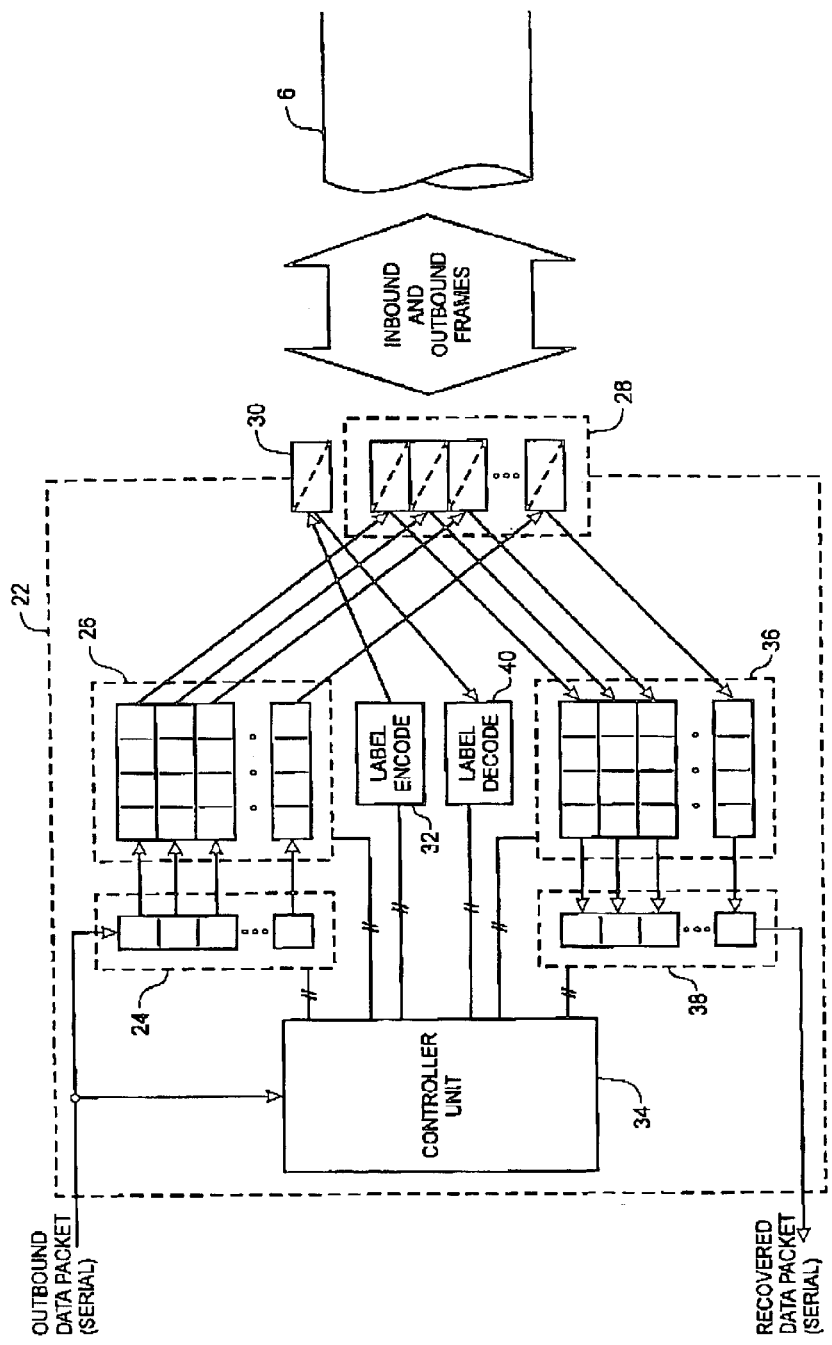
FIG. 3 is a block diagram schematically illustrating principal elements of an interface node of the optical communications network illustrated in FIG. 1.

FIG. 3 is a block diagram showing principal elements of an interface unit 22 which may be used in a gateway 14 or access point 12 to the optical network 2 to provide conversion between conventional data packet (e.g. IP or ATM) formats and the frames 16 used for transport across the optical network. In the illustrated embodiment, the data packets are transported across a federated network 12 and/or used by end user communications devices 8 as serial signals. Thus the interface unit 22 illustrated in FIG. 3 generally comprises a serial-to-parallel converter 24 which converts the serial bit stream of a data packet into N parallel data segments. A buffer 26 is connected to the serial-to-parallel converter 24 and is used to store each of the N data segments. A set of N optical couplers 28 are connected to the buffer 26 so that the data segments stored within the buffer can be converted into an optical signal having a respective unique wavelength and launched into an optical fiber link 6. An additional optical coupler 30 is provided for converting a frame label provided by a label generator 32 into an optical signal that is also launched into the optical fiber link 6. A controller unit 34 is used to control operation of the buffer 26, the label generator 32 and the optical couplers 28,30.

In operation, a data packet is received as a serial bit stream and supplied to the controller unit 34 and the serial-to-parallel converter 24. The serial-to-parallel converter 24 converts the serial bit stream of the data packet into N parallel bit streams which are stored in the buffer unit as data segments of the data packet. The controller unit 34 extracts and decodes the header portion of the data packet to determine the size (e.g. the bit count) of the data packet and its destination address. The controller unit 34 then controls the label generator 32 to assemble a frame label containing encoded information concerning at least routing across the optical network and the start time (TS) of the data blocks of the frame 16. The frame label is then passed to the respective optical coupler 30 and launched over the label channel of the optical link 6 as the label block 18. The controller unit 34 then controls the buffer 26 and optical couplers 28 to launch the buffered segments of the data packet as respective payload blocks 20. In cases where the size (bit count) of the data packet is less than the capacity of the frame 16, then the controller unit 34 can control the buffer 26 and the optical couplers 28 to insert stuff bits (e.g. a clock signal) as necessary in order to completely fill each payload block 20. Alternatively, where the size of the data packet is greater than the capacity of the frame 16, then a first portion of each data segment can be launched into the link 6 within the payload blocks 20 of a first frame, followed by a second frame 16 carrying a further (or residual) portion of the data packet. In this case, the encoded information in the label block 18 of the second frame will be closely similar to that of the first frame 16, in that the routing and start time information will be identical. However, the end time TE encoded in the second (or a last) frame 16 will likely be different from that of the first frame.

The above description, with reference to the embodiment of FIG. 3, describes the operation of the serial to parallel converter 24, the buffer 26, and the optical couplers 28,30 in terms of the conversion of a data packet into a frame 16 for transport across the optical network 2. It will be apparent, however, that a similar (or parallel) structure may also be used to convert an incoming frame 16 into a serial data packet. In this case, the optical couplers 28,30 may be conventional bi-directional optical couplers. The buffer 26 may also be designed to handle bi-directional data traffic, or alternatively a second buffer 36 may be employed to handle inbound frames 16. A parallel-to-serial converter 38 is then used to convert the parallel packet segments into a serial bit stream and so recover a (serial) data packet from the inbound frame 16. A label decoder 40 can be provided to decode the label block 18 of the inbound frame 16, and pass the start time TS and end time TE to the controller unit 34. As the recovered data packet is latched out of the parallel-to-serial converter 38, the controller unit 34 counts the number of bits. When the bit-count reaches the number of bits indicated by the end time TE encoded in the label block 18 of the inbound frame 16, the controller unit 34 terminates transmission of the recovered data packet, and discards any remaining bits of the inbound frame 16.

Figure 4:
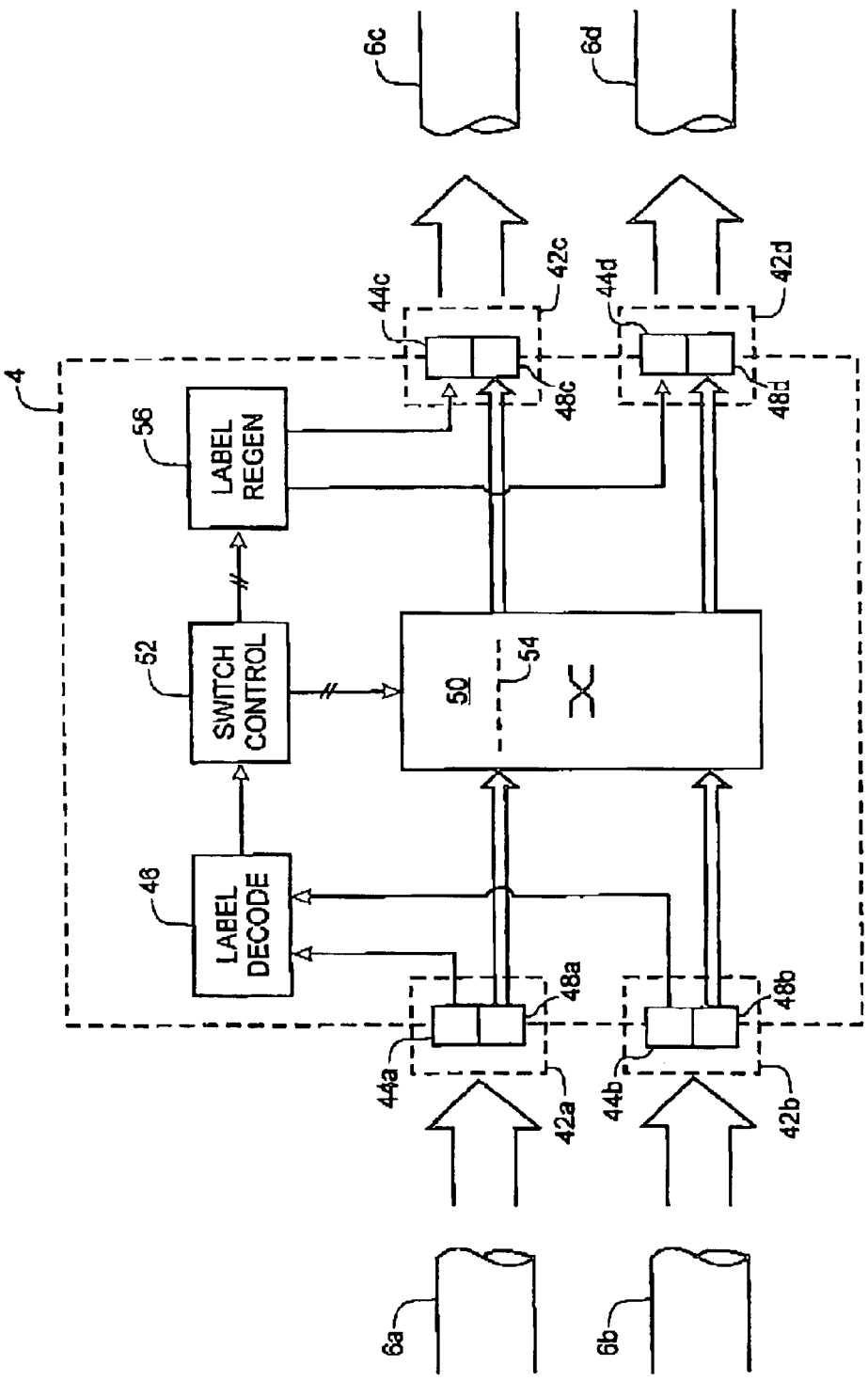
FIG. 4 is a block diagram schematically illustrating principal elements of an optical router usable in the optical communications network illustrated in FIG. 1.

FIG. 4 is a block diagram schematically illustrating the principal elements of an optical router 4 of the optical network. In the embodiment of FIG. 4 the optical router 4 is provided with two input ports 42a,b and two output ports 42c,d. However, it will be appreciated that a greater or smaller number of ports 42 may be provided in the optical router 4, and/or the optical router 4 may be provided with a plurality of ports 42 of which one or more may remain unused. It will also be appreciated that the ports 42 of the optical router may be suitably designed and connected to handle bi-directional data traffic. However, in order to simplify the present description, and aid understanding of the invention, the embodiment of FIG. 4 is provided with unidirectional ports two of which (input ports 2a,b) are connected to handle inbound frames, and the other two (output ports 42c,d) connected to handle outbound frames.

As shown in FIG. 4, an input port 42a is connected to receive inbound frames through a respective fiber optic link 6a. The input port 42a generally comprises an optical coupler 44a tuned to the label channel, and so receives the label block 18 of an inbound frame 16. The optical coupler 44a converts the label block 18 into an electrical signal which is passed to a label decoder 46. The input port 44a also provides a transparent optical connector 48a designed to guide the payload blocks 20 of an inbound frame 16 received over the data channels directly to an optical switch 50, without converting the optical signals into an electronic signal.

The label decoder 46 receives the frame label (in electronic form) from the optical coupler 44a and decodes the frame label to extract the encoded routing information. The routing information is then passed by the label decoder 46 to a switch controller 52 which uses the routing information to select one of the output ports 42c,d for launching the frame 16 over a downstream link 6c,d for the next hop towards the destination of the frame 16. Selection of the output port may be made by known methods, for example as defined under the MPLS protocol. In the present example, the switch controller 52 selects the output port 42c for the next hop. The switch controller 52 then controls the optical switch 50, which may for example be an optical space switch, to set up a transparent optical path 54 (shown by a dashed line) between the input port 42a and the selected output port 42c. Once the transparent optical path 54 has been established, payload blocks 20 of the frame 16 arriving at the input port will be conducted across the optical router 4 to the output port 42c and launched into the downstream link 6c without interruption or conversion into electrical signals. As noted previously, the start time (TS) is predetermined and selected so that the delay period (D) between the launch of the first bit of the label block 18 and the first bit of the payload blocks 20 is sufficiently large to ensure that the label block 18 of an incoming frame 16 can be converted into an electrical signal at the input port optical coupler 44a, decoded by the label decoder 46, and then used by the switch controller 52 to establish the transparent optical path 54 through the optical switch 50 between the input port 42a and the selected output port 42c prior to arrival of the first bit of the payload blocks 20 of the incoming frame 16. The switch controller 52 can also control a label regenerator 56 which regenerates the frame label and launches a new label block 58 of the frame 16 (see FIGS. 5 and 6) using an optical coupler 44c of the selected output port 42c.

In cases where the downstream link 6c is connected at its opposite end to an interface unit 22 such as shown in FIG. 3, then preservation of the delay period (D) between the first bit of the label block 18 and the first bit of the payload blocks 20 of the outgoing frame 16 is not critical. However, in general, the downstream link 6c must be assumed to be connected at its opposite end to an input port 42 of another optical router 4. In this case, reliable transport of a frame 16 across the optical network 2 requires that the delay period (D) must be preserved across each link. Thus the regenerated label constructed by the label regenerator 56 must be converted into an optical signal by the optical coupler 44c of the selected output port 42c and launched into the downstream link 6c as a new label block 58 at least a period of time (D) prior to arrival of the first bit of the payload blocks 20 at the selected output port 6c. This can conveniently be accomplished by providing each input port 42a,b with a delay loop (not shown) of a predetermined length which is sufficient to compensate for the time required to electrically convert and decode the label block 18 of the inbound frame 16, determine new routing information if required, regenerate the frame label and convert the regenerated frame label into new label block 58 launched into the downstream link 6c.

Figure 5:
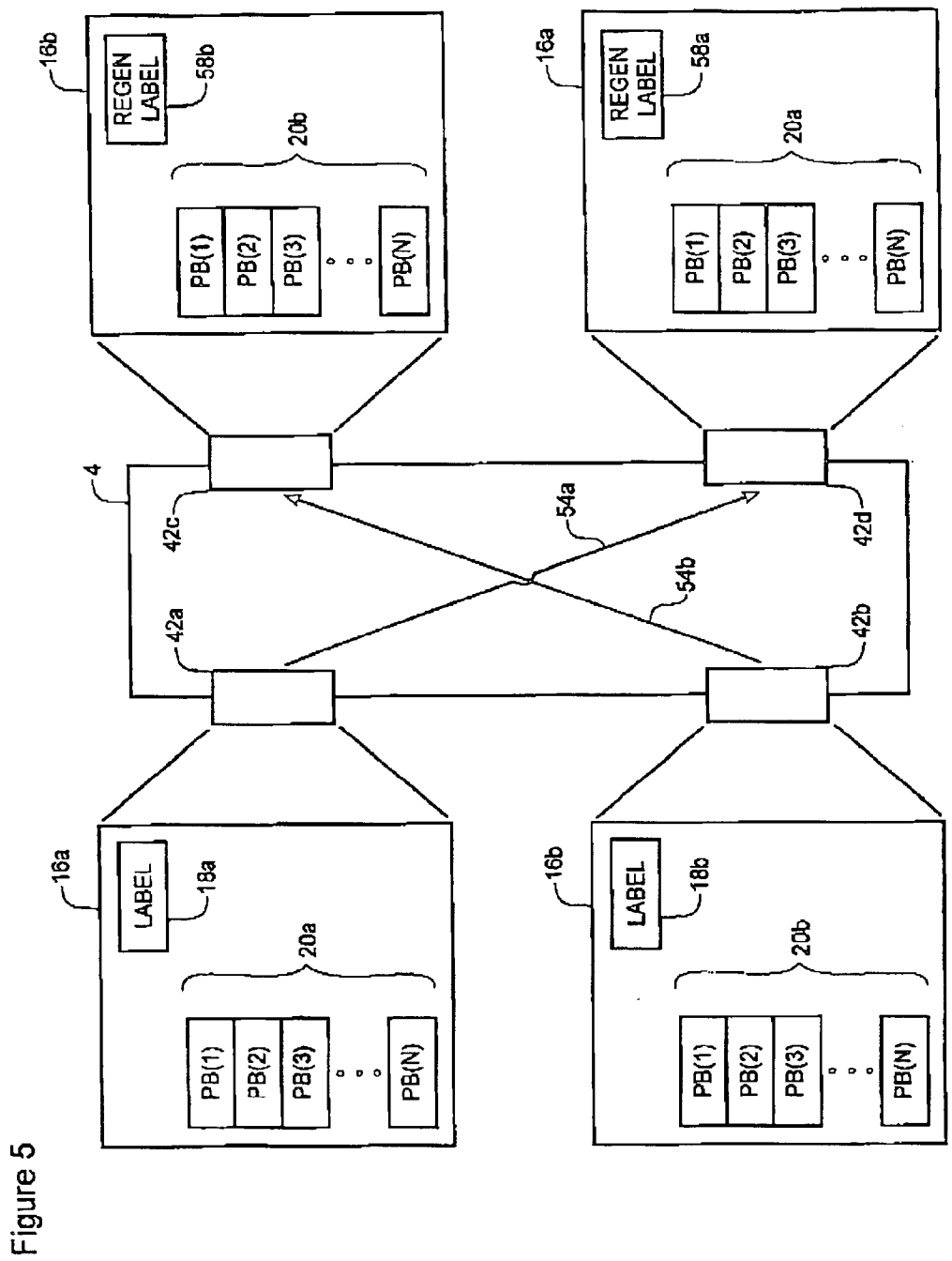
FIG. 5 is a block diagram schematically illustrating operation of the optical router of FIG. 4 in cases where incoming frames do not converge on a common output port.
Figure 6:
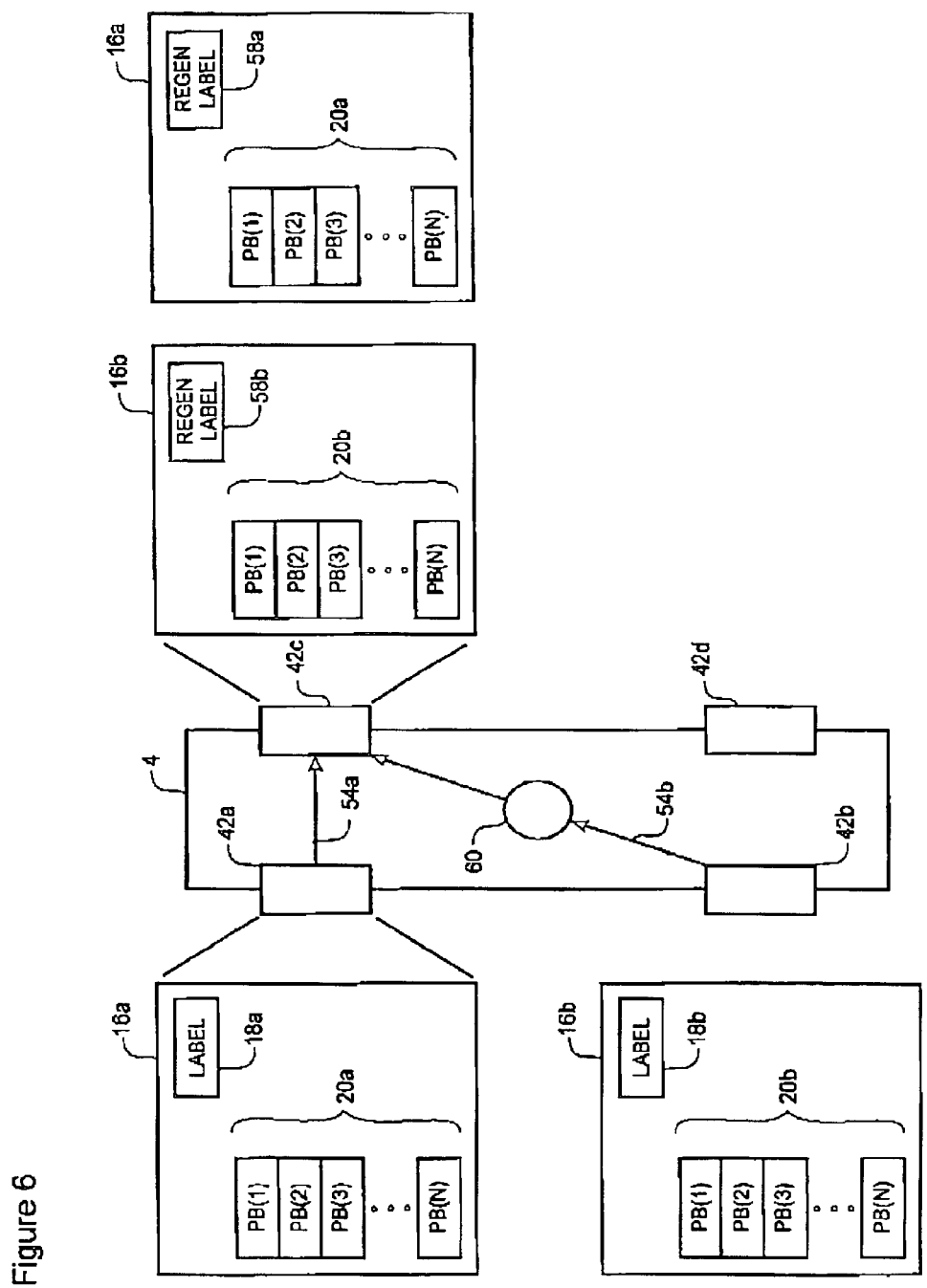
FIG. 6 is a block diagram schematically illustrating operation of the optical router of FIG. 4 in cases incoming frames converge on a common output port.

As shown in FIGS. 4–6 an optical router 4 may comprise two (or more) input ports 42a,b connected to respective inbound links 6a,b. In such cases it is possible for respective frames 16a,b to arrive substantially simultaneously at respective input ports 42a,b of the optical router 4. Parallel decoding of the respective frame labels 18a,b within the label decoder 46 is readily possible, as is parallel set-up of transparent optical paths 54a,b through the optical switch under the control of the switch controller. As shown in FIG. 5, if the routing information encoded in the respective frame labels 18a,b is such that the transparent optical paths 54a,b are set up through the optical switch to respective different output ports 42c,d then the payload blocks 20a,b of each frame 16a,b can be conducted through the optical router 4 and launched into their respective downstream links 6c,d without difficulty. However, as shown in FIG. 6, if the routing information encoded in the respective frame labels 18a,b requires transparent optical guide paths to be established across the optical switch to a common output port 42c, the resulting contention between the inbound frames 16a,b must be resolved in order to prevent destructive interference of the inbound frames 10a,b. As mentioned previously, the use of comparatively short payload blocks 20 minimizes the probability of contention issues arising, by reducing the likelihood that frames 16a,b may arrive at different input ports 42a,b at the same time (or close enough in time that the respective sets of payload blocks 20a,b would overlap upon convergence of the two frames 16a,b into the downstream link 6c). An added measure of reliability can also be obtained by providing a delay loop 60 within the router 4. Thus, in the event of frame contention, one of the transparent optical paths 54b can be routed through the optical switch 50 in such a way as to incorporate the delay loop 60. The delay loop 60 can conveniently be sized to impose a delay of a predetermined length, such as for example an integer multiple of the payload block length. Thus in the case of contending frames 16a,b arriving at respective input ports 42a,b, the payload blocks 20b of one of the contending frames 16b will be delayed by the delay loop 60 for a time sufficient to permit the payload blocks 20a of the other frame 16a to clear the router 4 and be launched into the downstream link 6c. Because the payload blocks 20 of each frame 16 are a predetermined fixed length, this operation can reliably be performed even when the data packets being transported within each frame 16a,b are of different length. Thus it will be seen that the present invention facilitates full optical routing of variable length data packets.

The embodiment(s) of the invention described above is(are) intended to be exemplary only. The scope of the invention is therefore intended to be limited solely by the scope of the appended claims.

I claim:

1. A method of routing variable-length packet data across a communications network having a plurality of data communications channels, the method comprising the steps of:
   a) inverse-multiplexing a data packet into a frame comprising:
      i) a label block containing label information of the frame, and
      ii) two or more respective payload blocks having a predetermined length;
   wherein the step of inverse-multiplexing a data packet comprises the step of dividing the data packet into N packet segments of substantially equal size; and
   b) transmitting the label block aver a label channel of the communications network;
   c) transmitting each payload block over respective separate data channels of the communications network; and d) when the size of each packet segment is greater than a capacity of each payload block, further comprising the steps of:
  i) subdividing each packet segment into two or more portions, each portion having a size equal to or less than the capacity of a payload block; and
  ii) transmitting each portion within respective payload blocks of respective successive frames.

2. A method of routing variable-length packet data across a communications network having a plurality of data communications channels, the method comprising the steps of:
  a) inverse-multiplexing a data packet into a frame comprising:
    i) a label block containing label information of the frame, wherein the label block comprises encoded information concerning at least a start time and routing across the network of the frame; and
    ii) two or more respective payload blocks having a predetermined length;
  b) transmitting the label block over a label channel of the comminations network;
  c) transmitting each payload block over respective separate data channels of the communications network;
  d) receiving the label block of a frame through a first port of a network node;
  e) decoding the label block to obtain the routing information;
  f) selecting a second port of the network node based on the routing information of the frame; and
  g) establishing a transparent optical path between the first and second ports, such that the payload blocks of the frame are guided through the network node via the first and second ports.

3. A method as claimed in claim 2, wherein the start time is indicative of a delay period between an arrival time of a first bit of the label block and an arrival time of a first bit of the payload blocks of a frame.

4. A method as claimed in claim 3, wherein the start time is selected such that the step of establishing the transparent optical path is completed prior to arrival of the payload blocks of the frame at the first port of the network node.

5. A method as claimed in claim 4, further comprising the steps of regenerating the label block of the frame, and transmitting the regenerated label block over the label channel through the selected second port.

6. A method an claimed in claim 5, further comprising a step of delaying the payload blocks of the frame for a predetermined period of time during passage of the payload blocks through the network node between the first and second ports, the predetermined period being selected to preserve the start time encoded in the label block as the frame passes through the network node.

7. A method of routing variable-length packet data across a communications network having a plurality of data communications channels, the method comprising the steps of:
  a) inverse-multiplexing a data packet into a frame comprising:
    i) a label block containing label information of the frame; and
    ii) two or more respective payload blocks having a predetermined length;
  wherein the step of inverse-multiplexing a data packet comprises the step of dividing the data packet into N packet segments of substantially equal size; and
  b) transmitting the label block over a label channel of the communications network;
  c) transmitting each payload block over respective separate data channels of the communications network;
  d) receiving a frame; and
  e) de-multiplexing the payload blocks of the frame to reconstruct the data packet.

8. A method as claimed in claim 7, wherein the label block comprises encoded information concerning and end time indicative of a location of a last bit of the data packet within the frame.

9. A method as claimed in claim 8, wherein the end time is a number of bits of the data packet.

10. A method as claimed in claim 8, wherein the step of receiving a frame comprises the steps of:
  a) receiving the label block of the frame;
  b) decoding the label block to extract the end time information; and
  c) receiving each payload block of the frame.

11. A method as claimed in claim 8, wherein the step of de-multiplexing the payload blocks of the frame comprises the steps of:
  a) buffering the bits of each payload block;
  b) selecting bits of the payload blocks received prior to the end time to extract each data segment of the data packet from its respective payload block; and
  c) assembling the data segments to reconstruct the data packet.

12. A method as claimed in claim 11, further comprising a step of discarding bits of the frame received after the end time.

13. A communications network adapted for communication of variable size data packets, the communications network comprising:
  a) an interface for inverse-multiplexing a data packet into a frame comprising:
    i) a label block containing label information of the frame; and
    ii) two or more respective payload blocks having a predetermined length;
  b) a first optical couplet for transmitting the label block over a label channel of the communications network; and
  c) a respective second optical coupler for transmitting each payload block over a respective separate data channel of the communications network.

14. A communications network as claimed in claim 13, wherein the first optical coupler is adapted to transmit the label block at a same bit rate an that of each respective second optical coupler.

15. A communications network as claimed in claim 13, wherein the first optical coupler is adapted to transmit the label block at a lower bit rate than that of each respective second optical coupler.

16. A communications network as claimed in claim 13, wherein the communications network is a wave division multiplex (WDM) optical network.

17. A communications network as claimed in claim 16, wherein the communications network is adapted for multi-protocol label switched (MPLS) routing of packet data traffic.

18. A communications network as claimed in claim 17, wherein the packet data traffic comprises any one or more of internet protocol (IP) packets and asynchronous transfer mode (ATM) frames.

19. A communications network as claimed in claim 18, wherein a number N of payload blocks and the predetermined length of each payload block of each frame are selected based on an expected mean size of the data packets.

20. A communications network as claimed in claim 19, wherein the interface is adapted to divide the data packet into N packet segments of substantially equal size.

21. A communications network as claimed in claim 20, wherein, when the size of each packet segment is leas than or equal to a capacity of each payload block, the interface is adapted to transmit each packet segment within a respective payload block of a single frame.

22. A communications network as claimed in claim 20, wherein, when the size of each packet segment is greater than the capacity of each payload block, the interface is adapted to:
 a) subdivide each packet segment into two or more portions, each portion having a size equal to or less than the capacity of a payload block; and
 b) transmit each portion within respective payload blocks of respective successive frames.

23. A communications network as claimed in claim 17, wherein the interface further comprises a label generator adapted to generate the label block including encoded information concerning at least a start time and routing of the frame across the network.

24. A communications network as claimed in claim 23, wherein the start time is indicative of a delay period between transmission of a first bit of the label block by the first optical coupler and transmission of a first bit of the payload blocks by the respective second optical couplers.

25. A communications network as claimed in claim 24, further comprising a network node adapted to route frames between a first and a second link of the communications network, the network node comprising:
 a) a label decoder adapted to decode a label block of a frame received aver the label channel through an input port connected to the first link;
 b) a controller responsive to the label decoder to generate a routing control signal;
 c) a switch responsive to the routing control signal to set up a transparent optical path between the input port and a selected output port connected to the second link; and
 d) a label regenerator adapted to regenerate a label block of the frame for transmission over the label channel through the selected output port.

26. A communications network as claimed in claim 25, wherein the start time is selected such that the switch has sufficient time to set up the transparent optical path prior to arrival of the payload blocks of the frame at the first port of the network node.

27. A communications network as claimed in claim 25, wherein the network node further comprises a third optical coupler adapted to transmit the regenerated label block over the label channel through the selected output port.

28. A communications network as claimed in claim 25, further comprising delay means adapted for delaying the payload blocks of the frame for a predetermined period of time during passage of the payload blocks through the network node between the input and output ports, the predetermined period being selected to preserve the start time encoded in the label block of the frame as it passed through the network node.

29. A router for routing packet data traffic between a first and a second link of a communications network adapted for communication of data packets having a variable length, the data packets being transported within frames comprising a label block and two or more payload blocks having a predetermined length, the label block being carried on a label channel of the communications network, and the payload blocks being carried substantially in parallel on respective data channels of the communications network, the node comprising:
 a) at least one input port connected to the first link for receiving sequential frames;
 b) at least one output port connected to the second link for launching sequential frames into the second link;
 c) a label decoder adapted to decode a label block received over the label channel through an input port;
 d) a controller responsive to the label decoder to generate a routing control signal indicative of a selected output port;
 e) a switch responsive to the routing control signal to set up a transparent optical path between the input port and the selected output pore; and
 f) a label regenerator adapted to regenerate the label block for sending over the label channel through the selected output port.

30. A router as claimed in claim 29, wherein the communications network in a wave division multiplex (WDM) optical network.

31. A router as claimed in claim 30, wherein the router is adapted for multi-protocol label switched (MPLS) routing of packet data traffic.

32. A router as claimed in claim 31, wherein the packet data traffic comprises any one or more of internet protocol (IP) packets and asynchronous transfer mode (ATM) frames.

33. A router as claimed in claim 31, wherein the label block includes encoded information concerning at least a start time and routing of the frame across the network.

34. A router as claimed in claim 33, wherein the start time is indicative of a minimum delay period between arrival of a first bit of the label block and arrival of a first bit of the payload blocks at the input port.

35. A router as claimed in claim 34, wherein the start time is selected such that the switch has sufficient time to set up the transparent optical path prior to arrival of the payload blocks of the frame at the input port.

36. A router is claimed in claim 35, further comprising an optical coupler adapted to transmit the regenerated label block over the label channel through the selected output port.

37. A router as claimed in claim 35, further comprising delay means adapted for delaying the payload blocks of the frame for a predetermined period of time during passage of the payload blocks through the network node between the input and output ports, the predetermined period being selected to preserve the start time encoded in the label block of the frame as it passes through the network node.

* * * * *

UNITED STATES PATENT AND TRADEMARK OFFICE
CERTIFICATE OF CORRECTION

PATENT NO. : 6,839,322 B1  Page 1 of 1
DATED : January 4, 2005
INVENTOR(S) : Peter J. Ashwood Smith It is certified that error appears in the above-identified patent and that said Letters Patent is hereby corrected as shown below:

Column 10,
Line 64, "aver" should read -- over --; and

Column 14,
Line 1, "passed" should read -- passes --.

Signed and Sealed this

Eighteenth Day of April, 2006

JON W. DUDAS
*Director of the United States Patent and Trademark Office*